M. A. GERBER.
Assignor of one-half to R. A. Pott.
RAILWAY SWITCH.
No. 10,883. Reissued Nov. 22, 1887.
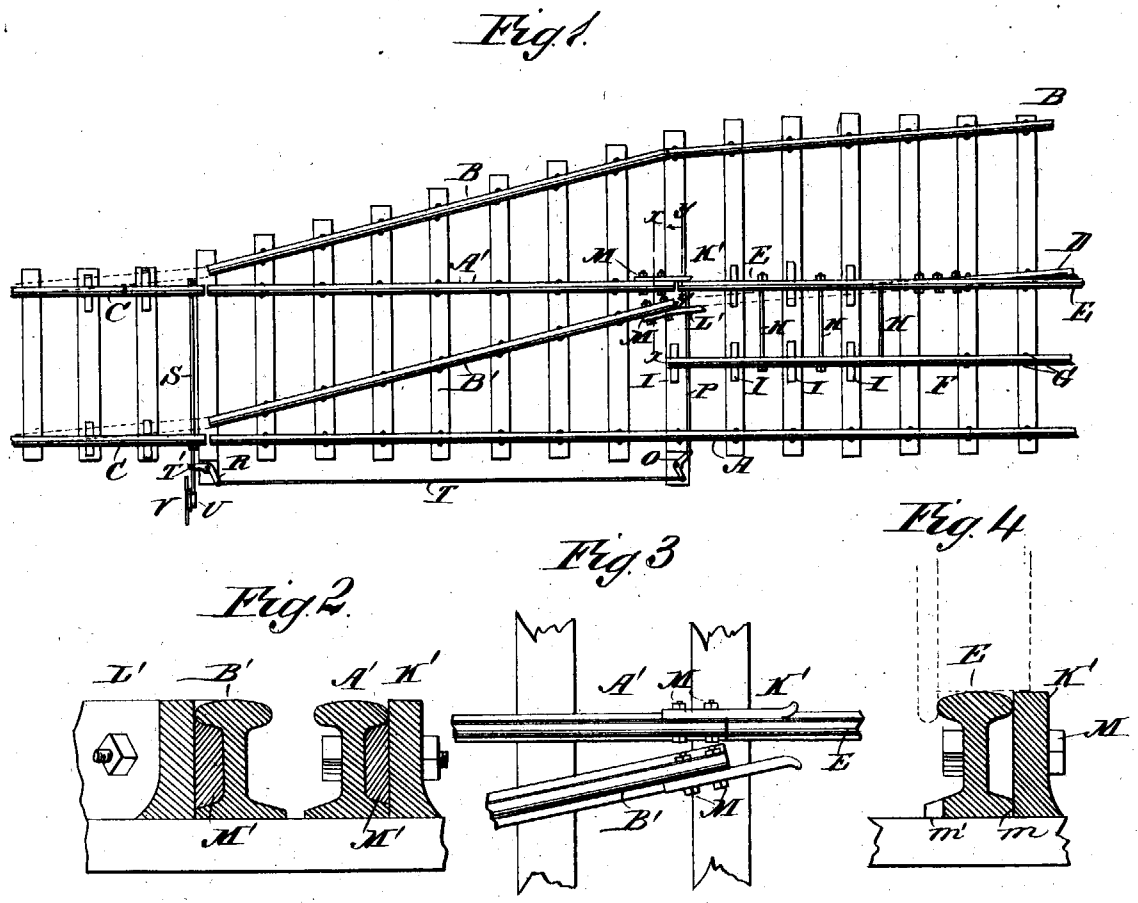
WITNESSES:
F. McArdle.
C. Sedgwick
INVENTOR:
M. A. Gerber
BY Munn & Co.
ATTORNEYS.
N. PETERS, Photo-Lithographer, Washington, D. C.

UNITED STATES PATENT OFFICE.

MAHLON A. GERBER, OF LOST CREEK, PENNSYLVANIA, ASSIGNOR OF ONE-HALF TO ROBERT A. POTT, OF SAME PLACE.

RAILWAY-SWITCH.

SPECIFICATION forming part of Reissued Letters Patent No. 10,883, dated November 22, 1887.

Original No. 363,380, dated May 24, 1887. Application for reissue filed July 1, 1887. Serial No. 243,181.

*To all whom it may concern:*

Be it known that I, MAHLON A. GERBER, of Lost Creek, in the county of Schuylkill and State of Pennsylvania, have invented a new and Improved Railway-Switch, of which the following is a full, clear, and exact description.

My invention relates to an improvement in railway-switches; and it consists in the construction and combination of devices, which will be more fully set forth hereinafter, and particularly pointed out in the claims, the object being to devise a practical frogless switch, and by which the usual frog-guard rails are dispensed with, giving a full-sized continuous rail grade crossing, and adapted to be attached to any switch now in use.

In the drawings, Figure 1 is a plan view of a railway-switch embodying my improvement. Fig. 2 is a detailed transverse sectional view of the same, taken on the line *x x* of Fig. 1. Fig. 3 is a detailed enlarged view; and Fig. 4 is a detailed transverse sectional view taken on the line *y y* of Fig. 1, looking to the left. The left-hand flange of the rail shown in this figure is cut away, as indicated at *m'* in said figure, so that said flange will not strike the extension L' and interfere with the alignment of the rail E with the cross switch-rail B'.

A represents one rail of the main track, and A' represents a short permanent section parallel with the rail A to complete the main track at the switch.

B represents the side and curved permanent switch-rail, and B' the cross switch-rail.

C represents the switch-rails, (shown in this instance of the "butt-switch" form,) and D the frog-rail, forming a part of the siding and bolted at its reduced beveled end to one of the rails of the main track, as shown in Fig. 1, said rail being marked E, and which is also a movable or switch rail. This switch-rail E forms a continuation of the main-track rail to which the frog-rail D is bolted, that portion of the said switch-rail which is beyond the juncture of the frog-rail being free to move laterally, and thereby adapted to align either with the rail A', forming a part of the main track, or the converging or cross switch-rail B', which forms a part of the side track.

F represents a spring stay-rail, which is arranged in the center of the main track, a portion of the said rail being rigidly secured to the cross-ties by the usual spikes, G, and the remaining portion of said rail corresponding to the free portion of the switch-rail E, being connected to the latter by means of bolt-rods H and free to move laterally with the switch-rail. The rods H can be shortened at the free end of the rail F, springing said rail sufficiently toward the rail E so that it will act as a balance or spring rail, and thus lighten the operation of the switch. To the cross-ties are secured the guards or chafe-plates I, arranged to prevent wear and friction of the rails upon the cross-ties.

An objection heretofore existing in switches of this character is that the wheels of the trains in passing to or from the ends of the switch-rails strike against the adjacent ends of the main-track rail A' and side-track rail B', thus exerting a tendency to loosen and displace the said rails, and also causing the truck to jolt and jar by reason of the intervening space between the end of the switch-rail and the rails A' and B'. To overcome this objection I provide the said rails A' B' at their adjacent ends with extensions K' and L', respectively, which are bolted to the outer sides of the said rails A' B' and project beyond the ends thereof, as shown, so as to overlap the joints between them and the switch-rail E. In order to firmly attach the said extensions to the rails I cut off the flanges of the rails at their outer sides, so as to reduce them to the width of the heads of the rails. Blocks M' are then arranged in the spaces formed between the head and bottom flanges of the rails, the said blocks bearing against the shanks or webs thereof, and the extensions K' and L' rest against the outer sides of the said blocks and are firmly secured to the rails A' B' by means of bolts M, which extend through transverse openings made in the shanks or webs of the rails, the blocks, and the extensions, and the said extensions may be spiked to the cross-ties or otherwise held.

The base-flanges of the rail E are cut off, as shown in full lines at *m* at the right of Fig. 4 and in dotted lines *m'* at the left in said figure, to reduce said base to the width of the head of the rail, so that said rail may be carried close to extensions K′ L′, thus effecting a perfect alignment of the rail E with the rails A′ B′. The base-flange of the rail E is not shown cut away in Fig. 3, as it should be; but the construction will be clearly understood from Fig. 4 and the above description.

By reference to Fig. 4 it will be observed that while the wheel of a railway-car is passing from either the rail A′ or B′ to the switch-rail E the tread of the said wheel will bear upon the extension K′ or L′, and thus the wheel will be prevented from jolting and bumping over the space between the said rails and the switch-rail. The extensions K′ and L′ also perform an exceedingly useful function in preventing the free end of the switch-rail from being moved too far in either direction and thus thrown out of alignment with the main or side track.

O represents a bell-crank lever, which is fulcrumed on the projecting end of one of the cross-ties, one arm of the said lever being connected to the free end of the switch-rail E and the stay-rail F by means of a rod, P.

R represents a similar bell-crank lever, which is fulcrumed to the projecting end of the cross-tie on which the free end of the switch-rails C rest, and one arm of this bell-crank lever is connected to the said switch-rails by means of a rod, S.

T represents a connecting operating-rod, which is arranged parallel with the main track, and on the outer side thereof, and connects the bell-crank levers O and R. The latter is provided with a horizontal operating-rod, T′, and a lever, U, and on the upper end of the lever U is the usual target, V, to indicate to the engineer of an approaching train the position of the switch.

The operation of my invention will be very readily understood. When the operating rod and lever are moved in one direction, the switch-rails C are caused to move into alignment with the side track, and the switch-rail E is caused to move into alignment with the side-track rail B′, as represented in dotted lines in Fig. 1. When the said operating rod and lever are turned in the contrary direction, the switch-rails C are caused to align with the main track, and the switch-rail E is caused to align with the main-track rail A′, as indicated in solid lines in Fig. 1, and the rail E may be made to move either the same or the opposite direction from the movement of the switch, as circumstances require.

Having thus described my invention, what I claim as new, and desire to secure by Letters Patent, is—

1. The converging rails A′ B′ and the extensions K′ L′ thereof, in combination with the siding-rails, the main-track rails, the switch-rail E, and the stay-rail, substantially as described.

2. The permanent main-track rails A A′, diagonal switch-rail B′, frog-rail D, and switch-rail E, the latter left free from the cross-ties at the switch end, in combination with the separate spring stay-rail F, secured to the cross-ties at one end only and bolted at its free end to the free end of the rail E, substantially as described.

3. In a railway-switch, the combination of the converging rails A′ and B′, the extensions K′ and L′ on the outer sides of the said converging rails and projecting beyond the ends thereof, the block interposed between each rail and its extension, and the switch-rail E, having its free end adapted to play laterally across the converging ends of the rails A′ and B′, for the purpose set forth, substantially as described.

4. In a railway-switch, the combination of the converging rails A′ and B′, having their base-flanges cut away on opposite sides at a suitable distance from their ends, the extensions fitted snugly against the outer sides of the said rails and projecting beyond the ends thereof, the blocks interposed between the said extensions and the opposing sides of the said rails, the said rails, blocks, and extensions being bolted together, and the switch-rail E, having its free end adapted to play laterally across the ends of the rails A′ and B′, substantially as described.

5. In a railway-switch, the combination of the converging rails A′ and B′, the extensions K′ and L′ on the outer sides of the said converging rails and projecting beyond the free ends thereof, the block interposed between each rail and its extension, the switch-rail E, having its free end adapted to play laterally across the converging ends of the rails A′ and B′, and the levers connecting the said switch and switch-rail, adapted to move the free ends of the same simultaneously, substantially as described.

6. The switch-rail E, having its base-flange reduced at each edge, as at *m m′*, in combination with the rails A′ B′, having the extensions K′ L′ secured to them, substantially as described.

MAHLON A. GERBER.

Witnesses:
M. J. GRIFFIN,
WM. H. GLENN.